United States Patent [19]

Bronson et al.

[11] Patent Number: 4,558,016

[45] Date of Patent: Dec. 10, 1985

[54] CERAMIC FIBER REINFORCED REFRACTORY

[75] Inventors: Stanley O. Bronson, Mountainside; John R. Peterson, Budd Lake; Edward B. Schumacher, Holmdel, all of N.J.

[73] Assignee: Exxon Research and Engineering Co., Florham Park, N.J.

[21] Appl. No.: 178,920

[22] Filed: Aug. 18, 1980

[51] Int. Cl.⁴ .................. C04B 35/02; C04B 35/80
[52] U.S. Cl. .................................. 501/95; 106/85; 501/124
[58] Field of Search ............... 106/57, 55, 67, 85; 501/95, 32, 87, 88, 124

[56] References Cited

U.S. PATENT DOCUMENTS

| | | | |
|---|---|---|---|
| 1,389,942 | 9/1921 | Freysainet | 52/662 |
| 1,633,219 | 6/1927 | Martin | 264/108 |
| 2,677,955 | 5/1954 | Constantinesco | 428/221 |
| 3,079,267 | 2/1963 | Konrad et al. | 501/124 |
| 3,231,401 | 1/1966 | Price et al. | 501/105 |
| 3,429,094 | 2/1969 | Romualdi | 52/659 |
| 3,547,664 | 12/1970 | Salazar | 501/127 |
| 4,103,063 | 7/1978 | Hulse | 501/95 |
| 4,130,631 | 12/1978 | Hamilton | 501/96 |
| 4,248,752 | 2/1981 | Myles | 501/96 |

FOREIGN PATENT DOCUMENTS

| | | | |
|---|---|---|---|
| 252975 | 6/1926 | United Kingdom . | |
| 303406 | 1/1929 | United Kingdom . | |
| 515003 | 11/1939 | United Kingdom . | |
| 799860 | 8/1958 | United Kingdom . | |
| 356264 | 11/1972 | U.S.S.R. | 501/94 |

*Primary Examiner*—Mark L. Bell

[57] ABSTRACT

A reinforced refractory product having increased tensile strength is provided comprising a refractory material such as a phosphate bonded castable refractory having distributed therein ceramic fibers in yarn form consisting of roved bundles of filaments.

A method of distributing the ceramic fibers in the refractory is also provided wherein a mix of water and refractory material matrix is first formed and thereafter the fibers are added. Such method substantially reduced the risk of fiber damage during incorporation of the fiber in the matrix.

28 Claims, No Drawings

CERAMIC FIBER REINFORCED REFRACTORY

BACKGROUND OF THE INVENTION

This invention deals with a ceramic fiber reinforced refractory product and a method for introducing ceramic fibers to a refractory material.

In the past concrete and refractory materials reinforced with metal in various forms have been described in the art which enhance the strength properties of the concrete or refractory into which they are incorporated.

In U.S. Pat. No. 3,429,094 to J. P. Romualde, for example, a two-phase material is described comprising steel wire within concrete, the wires being spaced not in excess of 0.5 inches to increase the cracking strength of the concrete. The material is prepared by mixing proportions of short pieces of wire directly with cement, sand and water or pouring a fluid mix of concrete around long pieces of wire. Similar wire reinforcing elements are described in British Pat. No. 515,003.

In U.S. Pat. No. 2,677,955 to G. Constantinesco a reinforced concrete material is described comprising a three dimensional and uniformly distributed mattress of wire comprised of short coils of helical elements in a hardsetting cement mass.

In U.S. Pat. No. 1,633,219 to G. C. Martin, a plastic material for forming a pipe is provided having mixed therein small lengths of iron, steel, or other metals, preferably pieces of wire, 1 to 4 inches in length, plain or crimped.

Other metal reinforcing elements have been described such as continuous metal elements in the form of sheets of layers connected together by fine metal wires twisted together as in U.S. Pat. No. 1,389,942, ribbon-like strips or shreds of iron and steel as per British Pat. No. 303,406 and thin metal bars as in British Pat. No. 799,860.

Steel fiber reinforcing elements about ¼" in length for concrete have also been described in British Pat. No. 252,975 comprising a length of wire or strip with deflected or extended ends which can be incorporated in concrete by addition or mixing with the aggregate, sand, cement and water forming the concrete.

Although metal additions to concrete or refractory materials enhance the strength properties of such materials, the reinformed products, by virtue of such metals, are susceptible to corrosion and loss of strength properties at high temperatures. Ceramic materials, such as ceramic fibers, are resistant to corrosion and maintain their strength properties at high temperatures making them ideally suited as substitutes for metals as reinforcing elements for refractories and other materials. Heretofore ceramic fiber reinforcement of refractories could not be successfully accomplished because of fiber breakage during incorporation and the difficulty of uniformly distributing the fiber in the refractory matrix during mixing.

The present invention solves the problem of ceramic fiber addition to materials such as concrete or castable refractories by employing a ceramic fiber in yarn form which is resistant to abrasion, breakage or surface flawing and can therefore be combined with the material to provide reinforcing properties. The result is a reinforced product having excellent strength and crack resistant properties even at high temperatures.

By employing the method of this invention such ceramic fibers are uniformly dispersed in the material matrix without substantial damage to the fiber's integrity.

SUMMARY OF THE INVENTION

The reinforced refractory product of the invention comprises a refractory material, particularly but not limited to a phosphate bonded castable refractory, having uniformly distributed therein ceramic fibers which bond to the material. The ceramic fibers are added to the refractory material in yarn form, the yarn consisting of roved bundles of filaments which can additionally contain a sizing material such as, but not limited to, polytetrafluoroethylene. It has been found that tensile strengths of such reinforced products as measured by Modulus of Rupture can be increased up to 41% over the same product containing no ceramic fibers. Due to the ceramic fibers having better resistance than metals to oxidation and corrosion, the products reinforced with them maintain their strength properties to higher temperatures.

A method for preparing the reinforced refractory materials is also provided which comprises forming a mix of water and refractory material matrix having a plastic consistency and thereafter blending the ceramic fibers with the mix until a uniform dispersion of fibers in the matrix is formed. Preferably the fibers are blended into the mix 1 minute after formation of the mix by addition of water and stirred thereafter for about one minute. By virtue of such method the risk of damage and abrasion of the fibers is substantially reduced. The resulting dispersion may then be formed into molds, cured, dried and fired to form the reinforced refractory product. Such reinforced refractories find use in high temperature processes such as coking operations, coal liquefaction processes and as furnace burner blocks.

Other hydraulic or chemical bonded castable refractory will work in this invention provided a proper sizing/ bonding agent is used. Where fibers are to be used as stress interruptors, then bonding is not needed. Ceramic fibers will then perform a stress relief function and still resist errosive atmospheres.

The term "ceramic" is meant to include non-metals that are temperature and corrosion resistant. (i.e. graphite, silicon carbide, nitrides, aluminas, etc.)

The term "yarn" can mean a roving, twist, braid, weave or similar construction stabilized by the construction, addition of other strengthening fibers or a metal or refractory coating (i.e., a wire bound roving or $1\mu$ carbide/metal coating depending upon the strength/adhesion to be developed).

The term "fibers" means any configuration of refractory fiber such as twist, weave, coated, uncoated, etc.

The term "matrix" is meant the refractory components to which the yarn is added.

The term "refractory" is meant to include any and all such materials of this general class which can be formed, shaped or cast in the process of manufacture as a final product.

DETAILED DESCRIPTION OF THE PREFERRED EMBODIMENTS

The high tensile strength achieved by the ceramic fiber reinforced refractory products of this invention depend upon three criteria: a uniform dispersion of ceramic fiber in the refractory, a good fiber to refractory matrix bond and the maintenance of the integrity of the fibers in the matrix that is, the prevention of excessive mechanical damage to the fiber during its incorporation into the matrix.

By selecting a refractory material and ceramic fiber which will mutually bond in the finished reinforced refractory and by employing a method which will insure the uniform dispersion of and prevention of damage to the fiber during preparation of the refractory, tensile strengths can be increased up to 41% over the same refractory material containing no reinforcing fiber addition.

The preferred refractory material and ceramic fibers for producing the reinforced refractory of this invention is a phosphate-bonded castable refractory and an alumina-boria-silicate fiber in yarn form. It has been found that such ceramic fiber wets and bonds well to the phosphate bonded castable refractory matrix during mixing in the presence of water and maintains such bonding in the finished fiber reinforced refractory.

Particularly preferred is a ceramic fiber material in a yarn form containing 62% alumina, 14% boria and 24% silica, the yarn comprising roved bundles of 11 micron diameter filaments (390 filaments to a bundle) and sized with an organic polymeric material such as polytetrafluoroethylene (PTFE). One such yarn is sold under the mark ABS-312 by the 3M Company. This fiber material has excellent strength and high temperature properties, e.g. tensil strength of 250,000 p.s.i., maximum use temperature of 3000° F. and extended use temperature of 2600° F.

The use of a ceramic fiber in yarn form overcomes many problems which heretofore prevented use of ceramic materials as reinforcing elements for refractories. Ceramic fibers are generally brittle and are subject to breakup and surface flawing during mixing with an abrasive material such as a refractory material matrix. Fibers in this condition have little strength and are therefore ineffective as reinforcing elements. Ceramic fibers in yarn form, however, are highly flexible, durable and resistant to mechanical damage. The roving of the yarn also keeps the fibers grouped while permitting intimate contact with the refractory matrix binder. Sizing of the fibers with an organic polymer such as polytetrafluoroethylene also adds a degree of protection against mechanical damage. However, it is preferred that such sizing material be present in relatively small amounts, i.e. about 6% or less by weight of the fibers because such sizing material tends to inhibit formation of fiber/matrix bonding which is important in promoting strength properties. In come cases it may even be eliminated. Further, since the fiber diameters used are less than 0.010" the matrix/fiber contact area is more effective than metal fibers and therefore provides better crack arresting and stress relief capability and thermal shock resistance to the refractory than refractories reinforced with metal fiber only available in larger diameters.

Other refractory materials and ceramic fibers may be employed in forming reinforced refractory products provided that they meet the criteria of mutual bonding and that the fibers are uniformly dispersed in the refractory without significant damage. Similarly, materials other than refractories may be used as the incorporating material for the fibers such as concrete.

It has also been found that by mixing the ceramic fibers with the refractory material by the method of this invention that uniform dispersion of fiber in matrix can be achieved with minimal damage to the fibers. Such method comprises adding to the refractory matrix a predetermined quantity of water to form a mix, stirring said mix to a plastic consistency and blending the ceramic fibers with said mix until a product comprising a uniform dispersion of fibers in said matrix is formed. The so-formed dispersion is then formed into molds, cured, dried and fired to produce the reinforced refractory.

Preferably, the addition of fibers to the mix should occur two minutes after the addition of water to the refractory matrix and thereafter the mix is stirred for about one minute. The fibers are preferably added to the mix by hand sprinkling to prevent agglomeration of the fibers, however, a mechanical system for doing this can be devised.

The invention may be more particularly described in the following example.

EXAMPLE 1

This Example illustrates the preparation of a phosphate bonded castable refractory (PBCR) reinforced with ceramic fibers. The ceramic fibers employed were filaments of 62% alumina 14% boria and 24% silica in yarn form generally comprised of roved bundles of filaments having an average diameter of about 11 microns (390 filaments to a bundle) and sized with about 4.9 wt. % polytetrafluoroethylene (PTFE).

The particular stranding of the fibers were of the following types:

1. Two strands of 390 filament bundles twisted into yarn form, hereafter designated A.

2. Two twisted strands of 390 filament bundles roved with two other twisted strands, hereafter designated B.

3. Same as B but stranding fused by PTFE sizing, hereafter designated C.

4. Four twisted strands of 390 filament bundles roved with eight other four strand twists, hereafter designated D.

The fibers had the following physical properties:

| Density | 2.70 gm/cc |
|---|---|
| Filament tensile strengths | 250,000 p.s.i. |
| Filament tensile modulus of elasticity | 22,000,000 p.s.i. |
| First liquid phase | 1700° C. |
| Extended use temperature | 1427° C. (2600° F.) |
| Short term use temperature | 1650° C. (3000° F.) |
| Melt temperature | 1800° C. (3272° F.) |

The phosphate bonded plastic refractory was blended with an added amount of potable water sufficient to achieve a "stiff plastic" consistency for each batch of castable material in a Hobart mixer. Once the optimum water content was determined for a batch the same water content was used for mixes of control samples (no fiber additions) and samples with fiber additions. The amount of water used varied from 4.8 to 7.5 wt. % of the sample. The particular ceramic fiber yarn was cut into 1 ½ inch lengths and added to the refractory and water mix 2 minutes after the addition of water to the refractory. Agglomeration of fibers was avoided by carefully hand sprinkling the fibers into the mix. Stirring was continued for one minute after fiber addition.

Several PBCR samples measuring 1"×1"×4" were formed for each mix in plexiglass molds and air cured for 24 hours. After curing, samples were removed from the molds, dried and fired to 1500°. Upon cooling, the samples were weighed and dimensions measured with a slide caliper.

Pre-fired samples were loaded under three point bending at room temperature in accordance with ASTM C268. Data were obtained using a Reihle Model FS 120 testing machine and samples were broken over a span of 3". The Modulus of Rupture per square inch was calculated from the following formula:

$$M = \frac{3Pl}{2bd^2}$$

where:
M=modulus of rupture (psi)
P=load at which sample failed (pounds)
l=span (inches, l=3 inches)
b=width of sample brick (inches)
d=thickness of sample brick (inches)

The percent (%) Modulus of Rupture Change was then calculated from the Modulus of Rupture of each control and corresponding ceramic fiber reinforced sample. Table 1 summarizes the results:

TABLE 1

| % water in SAMPLE | Ceramic Fiber Content & Type | % Modulus of Rupture Change |
|---|---|---|
| 4.84 | Control (No fibers) | — |
| 4.84 | 0.5 wt. % B | +35.9 |
| 4.84 | 1.0 wt. % B | +36.0 |
| 5.50 | Control (No fibers) | — |
| 5.50 | 0.5 wt. % A | +18.7 |
| 5.50 | 0.25 wt. % A | +32.9 |
| 5.50 | 0.5 wt. % C | +41.4 |
| 4.80 | Control (No fibers) | — |
| 4.80 | 0.27 wt. % D | +29.3 |
| 4.80 | 0.25 wt. % B | +28.5 |
| 4.80 | Control (No fibers) | — |
| 4.80 | 0.33 wt. % B | +16.3 |

As Table 1 shows, in all cases the Modulus of Rupture increased over the controls by the addition of the ceramic fibers depending on the amount and type of fibers with the highest percentage obtained using 0.5 wt. % of type C fiber (41%).

A polished section micrograph of a sample of phosphate bonded castable refractory containing 4.8 wt. % $H_{20}$ and 0.25 wt. % 1-0 fibers was taken. The micrograph showed that filaments near the periphery of the yarn were completely engulfed by refractory matrix and appeared to be as intimately bonded to it as the surrounding alumina aggregate.

What is claimed is:

1. A reinforced refractory product comprising a refractory material having ceramic fibers in yarn form in an approximate percentage by weight of the total in a range from 0.25 to 1.0 distributed therein, said fibers being in yarn form for the purpose of enhancing the modulus of rupture of said product.

2. The product of claim 1 wherein said refractory material is a phosphate bonded castable refractory.

3. The product of claim 1 wherein said ceramic fibers are comprised of an alumina-boria-silicate composition.

4. The product of claim 3 wherein said ceramic fibers comprise 62% alumina, 14% boria and 24% silica by weight.

5. The product of claim 1 wherein said ceramic fibers are comprised of filaments having a filament tensile strength of at least about 250,000 p.s.i.

6. The product of claim 5 wherein said filaments have an average diameter of about 11 microns.

7. The product of claim 1 wherein said fibers are sized with an organic polymeric material.

8. The product of claim 7 wherein sadi organic polymeric material is polytetrafluoroethylene.

9. A reinforced refractory product of enhanced modulus of rupture at temperatures of between approximately 1000° F. to 1600° F., comprising a phosphate-bonded castable refractory having ceramic fibers in yarn form distributed therein in an approximate percentage by weight of the total in a range from 0.25 to 1.0.

10. The product of claim 9 wherein said fibers are comprised of an alumina-boria-silicate composition.

11. The product of claim 10 wherein said fiber comprises 62% alumina, 14% boria and 24% silicate.

12. The product of claim 9 wherein said yarn formed of said ceramic fibers comprises roved bundles of filaments.

13. The product of claim 12 wherein said filaments have an average diameter of about 11 microns.

14. The product of claim 12 wherein said filaments have a tensile strength of at least about 250,000 p.s.i.

15. The product of claim 9 wherein said ceramic fibers in yarn form are sized with polytetrafluoroethylene.

16. A reinforced refractory product comprising a phosphate-bonded castable refractory having ceramic fibers distributed therein, said fibers being a yarn comprised of roved bundles of filaments of an alumina-boria-silicate composition in approximate percent by weight of the total in a range from 0.25 to 1.0.

17. The product of claim 16 wherein said fibers are comprised of 62% alumina, 14% boria and 24% silica.

18. The product of claim 16 wherein said filaments have a filament tensile strength of at least about 250,000 p.s.i.

19. The product of claim 16 wherein said filaments have an average diameter of 11 microns.

20. The product of claim 16 wherein said fibers are sized with polytetrafluoroethylene.

21. A method of forming a product of ceramic fibers in yarn form in a refractory material, comprising the steps of:
 (a) forming a mix of a refractory matrix and water; and
 (b) blending said ceramic fibers in yarn form in approximate percentage by weight of the total in a range from 0.25 to 1.0, with said mix until said fibers are dispersed therein.

22. The method of claim 21 wherein said refractory material is a phosphate bonded castable refractory.

23. A method of forming a product of enhanced modulus of rupture comprising ceramic fibers in yarn form in a refractory material, comprising the steps of:
 (a) adding water to a refractory matrix to form a mix having a plastic consistency; and
 (b) adding and blending said ceramic fibers in yarn form in approximate weight of the total in a range from 0.25 to 1.0, with said mix until said fibers are dispersed therein.

24. The method of claim 23 wherein said refractory material is a phosphate bonded castable refractory.

25. The method of claim 24 wherein said blending step is performed about two minutes after adding said water.

26. The method of claim 24 wherein said blending occurs for one minute after adding said fibers.

27. A method of forming a product of enhanced modulus of rupture comprising ceramic fibers in yarn form in a refractory material, comprising the steps of:

(a) adding a quantity of water to a refractory matrix with water sufficient to form a mix having a plastic consistency;
(b) adding said ceramic fibers in yarn form in an approximate percentage by weight of the total in a range from 0.25 to 1.0, to said mix about two minutes after adding said water; and
(c) blending said fibers with said mix for about one minute.

28. The method of claim 27 wherein said refractory is a phosphate bonded castable refractory.

* * * * *